(12) United States Patent
Khan et al.

(10) Patent No.: US 8,095,775 B1
(45) Date of Patent: Jan. 10, 2012

(54) INSTRUCTION POINTERS IN VERY LONG INSTRUCTION WORDS

(75) Inventors: Moinul H. Khan, Austin, TX (US); Anitha Kona, Austin, TX (US); Mark N. Fullerton, Austin, TX (US)

(73) Assignee: Marvell International Ltd., Hamilton (BM)

(*) Notice: Subject to any disclaimer, the term of this patent is extended or adjusted under 35 U.S.C. 154(b) by 432 days.

(21) Appl. No.: 12/274,235

(22) Filed: Nov. 19, 2008

Related U.S. Application Data

(60) Provisional application No. 60/989,683, filed on Nov. 21, 2007.

(51) Int. Cl.
G06F 15/76 (2006.01)
G06F 9/38 (2006.01)

(52) U.S. Cl. .......... 712/24; 712/205; 712/206; 712/208

(58) Field of Classification Search .............. 712/14, 712/205, 206, 208
See application file for complete search history.

(56) References Cited

U.S. PATENT DOCUMENTS

| | | | |
|---|---|---|---|
| 5,535,397 A | | 7/1996 | Durante et al. |
| 5,649,135 A | * | 7/1997 | Pechanek et al. ............. 712/200 |
| 5,768,500 A | | 6/1998 | Agrawal et al. |
| 5,778,070 A | * | 7/1998 | Mattison ....................... 713/191 |
| 5,933,627 A | | 8/1999 | Parady |
| 5,943,493 A | * | 8/1999 | Teich et al. ................... 712/228 |
| 6,018,759 A | | 1/2000 | Doing et al. |
| 6,151,668 A | * | 11/2000 | Pechanek et al. ............... 712/24 |
| 6,446,191 B1 | * | 9/2002 | Pechanek et al. ............... 712/24 |
| 6,615,355 B2 | * | 9/2003 | Mattison ....................... 713/193 |
| 7,203,821 B2 | * | 4/2007 | Thimmannagari ........... 712/228 |
| 7,249,246 B1 | * | 7/2007 | Banning et al. ............... 712/227 |
| 7,647,473 B2 | * | 1/2010 | Kamigata et al. ............... 712/24 |
| 7,765,342 B2 | * | 7/2010 | Whalley et al. ................. 710/49 |
| RE41,703 E | * | 9/2010 | Pechanek et al. ............... 712/24 |
| 7,818,542 B2 | * | 10/2010 | Shen et al. ..................... 712/210 |
| 2002/0161986 A1 | * | 10/2002 | Kamigata et al. ............... 712/24 |
| 2005/0050542 A1 | | 3/2005 | Davis et al. |
| 2007/0136561 A1 | * | 6/2007 | Whalley et al. ............... 712/209 |
| 2009/0019257 A1 | * | 1/2009 | Shen et al. ....................... 712/23 |
| 2010/0199288 A1 | | 8/2010 | Kalman |

OTHER PUBLICATIONS

"Final Office Action", U.S. Appl. No. 12/356,761, (Jun. 3, 2011), 10 pages.
"Non-Final Office Action", U.S. Appl. No. 12/254,506, (Apr. 26, 2011), 18 pages.
"Non-Final Office Action", U.S. Appl. No. 12/356,761, (Feb. 25, 2011), 8 pages.
Balakrishnan, Saisanthosh et al., "The Impact of Performance Asymmetry in Emerging Multicore Architectures", *In Proceedings of ISCA 2005*, 12 pages.
Kumar, Rakesh et al., "A Multi-Core Approach to Addressing the Energy-Complexity Problem in Microprocessors", *In Proceedings of WCED 2003*, (Jun. 2003), pp. 1-8.
Kumar, Rakesh et al., "Single-ISA Heterogeneous Multi-Core Architectures: The Potential for Processor Power Reduction", *In Proceedings of MICRO-36 2003*, 12 pages.

\* cited by examiner

Primary Examiner — Aimee Li

(57) ABSTRACT

During operation of a VLIW processor, a very long instruction word is fetched. A portion of the very long instruction word that includes a pointer to an instruction is identified, and the instruction pointed to by the pointer is retrieved from a location of an instruction window. The retrieved instruction is input into a functional unit for execution.

27 Claims, 5 Drawing Sheets

INSTRUCTION POINTERS IN VERY LONG INSTRUCTION WORDS

RELATED APPLICATIONS

This application claims priority to U.S. Provisional Application Ser. No. 60/989,683, filed on Nov. 21, 2007, the disclosure of which is incorporated by reference herein in its entirety.

BACKGROUND

Very long instruction word (VLIW) techniques can be used to execute multiple instructions concurrently in a processor, thereby increasing processor performance. When a program is compiled for a VLIW processor, multiple instructions of the program are combined together into a single very long instruction word. During execution of the program, a very long instruction word is fetched from memory and decoded, and each of the instructions within the very long instruction word is input to one of multiple functional units of the processor where it is executed. Each of the instructions within a very long instruction word can be input to a different functional unit, so each of the instructions within the very long instruction word can be executed concurrently.

Although this concurrent execution of multiple instructions can improve processor performance, there are still problems associated with this approach. One such problem is bandwidth requirements in the processor due to the number of bits in a very long instruction word, also referred to as the width of the very long instruction word. As the very long instruction words can include multiple instructions, a large number of bits may be used. Accordingly, this large number of bits typically employs a relatively wide instruction memory in order to accommodate the width of the very long instruction words. Further, a wide instruction path from the instruction memory to the decode unit is also employed in order to accommodate the width of the very long instruction words. These required widths increase the costs of VLIW processors and increase the physical space used within VLIW processors to route data within the processors.

SUMMARY

This Summary is provided to introduce subject matter that is further described below in the Detailed Description and Drawings. Accordingly, the Summary should not be considered to describe essential features nor used to limit the scope of the claimed subject matter.

In one or more embodiments, a method comprises fetching a first very long instruction word and identifying a first portion of the first very long instruction word that includes a first pointer to a first instruction. The method retrieves, from a first location of a first instruction window that has been pre-loaded with the first instruction, the first instruction pointed to by the first pointer, and inputs the retrieved first instruction into a first functional unit for execution.

In one or more embodiments, a processor comprises a fetch unit to fetch a first very long instruction word, a first instruction window to store a first instruction, multiple functional units to execute instructions, and a decode unit. The decode unit is to identify a first portion of the first very long instruction word that includes a first pointer to the first instruction; retrieve, from a first location of the first instruction window that has been pre-loaded with the first instruction, the first instruction pointed to by the first pointer; and input the retrieved first instruction into a first one of the multiple functional units for execution.

In one or more embodiments, a computer readable medium has stored thereon multiple instructions that, when executed by a processor, causes the processor to generate a first very long instruction word having both an instruction word type identifier and multiple portions, a first portion of the multiple portions including a first pointer to a first instruction that has been pre-loaded into a first instruction window of the processor, and the instruction word type identifier indicating which of the multiple portions is the first portion.

BRIEF DESCRIPTION OF THE DRAWINGS

The same numbers are used throughout the drawings to reference like features.

DETAILED DESCRIPTION

Instruction pointers in very long instruction words (VLIWs) are discussed herein. A VLIW includes an instruction word type as well as additional portions. Each of these additional portions can include an instruction (or portion thereof) or a pointer to an instruction. The instruction word type indicates which one or more portions of the VLIW include instructions and which one or more portions include pointers to instructions. Various instructions can have been previously stored in an instruction window, and particular ones of these various instructions can be pointed to by the pointers. The VLIW is fetched from memory and then the instructions that are pointed to within portions of the VLIW are retrieved from the instruction window of the processor. These pointed-to instructions, as well as instructions in portions of the VLIW, are then input to functional units of the processor for execution.

Figure 1:
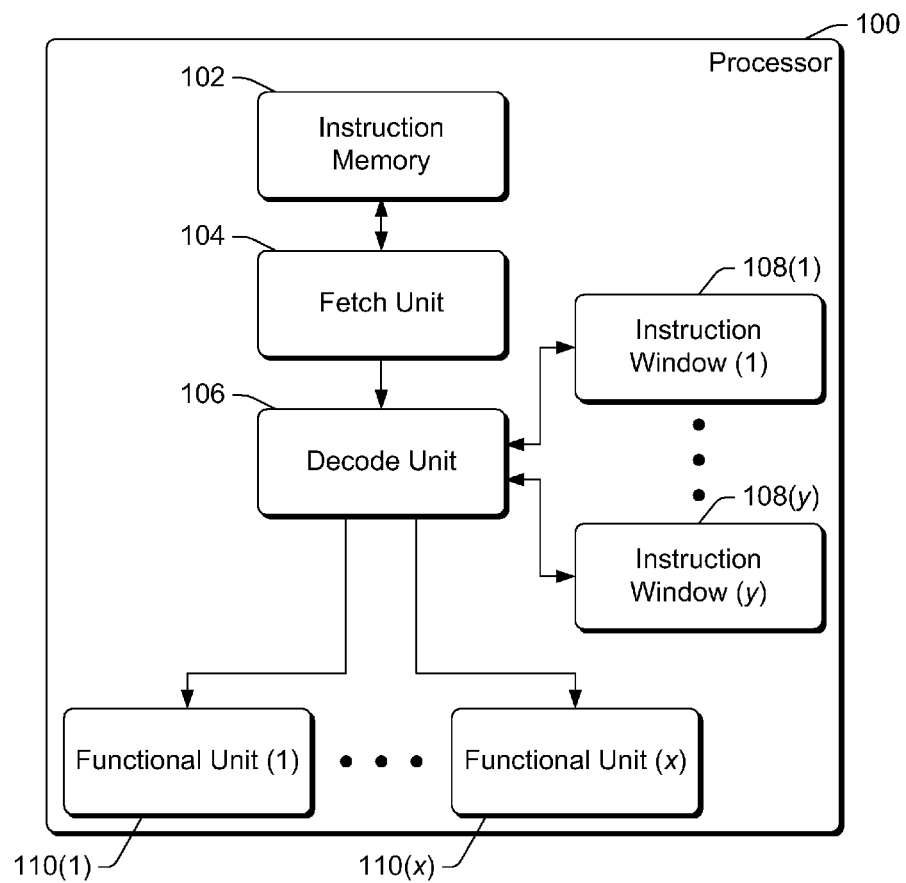
FIG. 1 illustrates an example processor implementing the instruction pointers in very long instruction words in accordance with one or more embodiments.

FIG. 1 illustrates an example processor 100 implementing instruction pointers in very long instruction words in accordance with one or more embodiments. Processor 100 can be a variety of different processing units, such as a central processing unit (CPU), a core of a CPU, a microcontroller, and so forth. Processor 100 includes an instruction memory 102, a fetch unit 104, and a decode unit 106. Instruction memory 102 is one or more memories in which instructions are stored and retrieved (fetched) by fetch unit 104. Instruction memory 102 is typically a cache memory, although alternatively instruction memory 102 can be implemented in other non-cache memories, including volatile memory (e.g., RAM), and non-volatile memory (e.g., ROM, Flash memory, and so forth).

Processor 100 also includes one or more instruction windows 108(1-y). Each instruction window 108 is a set of memory locations typically implemented as a set of registers. Each location in instruction windows 108 can store a particular instruction. The instruction windows 108 allow a VLIW to identify a particular instruction in windows 108 by a pointer rather than including the instruction itself in the VLIW. Prior to execution of a VLIW having a pointer to an instruction in a window 108, the pointed-to instruction is loaded into a location of a window 108. The particular instructions can be loaded into windows 108 using an instruction window load operation, or alternatively in other manners as discussed in more detail below. The instructions in windows 108 remain in windows 108 during execution of a program, allowing multiple VLIWs of the program to include pointers to those instructions.

The instructions are pre-loaded into instruction windows 108. This pre-loading of an instruction refers to loading or otherwise storing the instruction in a location of an instruction window 108 before a VLIW including a pointer to that instruction is decoded by decode unit 106. The particular instructions that are pre-loaded into instruction windows 108 can vary by implementation and by program. In one or more embodiments, a program compiler selects a set of frequently used instructions for each program. The program compiler can identify the frequently used instructions in a variety of manners, such as by receiving an input from a program designer or tester that identifies the frequently used instructions, analyzing the program to identify frequently appearing instructions, and so forth. During execution of each program, the program being executed stores the frequently used instructions for that program in instruction windows 108. Accordingly, the instructions stored in instruction windows 108 can change based on which program is being executed.

Alternatively, the instructions pre-loaded into instruction windows 108 can be static across programs rather than changing for different programs. The instructions can be pre-loaded into instruction window(s) 108 in a variety of different manners, such as by a designer or other user of processor 100, by an operating system running on processor 100, by another program or component, and so forth.

In addition, instructions can be identified for storage in instruction windows 108 based on criteria other than frequency of use. For example, instructions of a particular type can be stored in instruction windows 108, instructions associated with particular functionality (e.g., a loop buffer sequencer) can be stored in instruction windows 108, instructions can be selected randomly for storage in instruction windows 108, and so forth. The program compiler can use a variety of criteria to determine which instructions are stored in instruction windows 108.

During operation of processor 100, instructions are stored in memory 102 as part of very long instruction words, with each very long instruction word including multiple instructions. Fetch unit 104 retrieves the very long instruction words from instruction memory 102 and inputs the retrieved very long instruction words to decode unit 106. Each very long instruction word can include one or more instructions and/or one or more pointers to one or more instructions in an instruction window 108. It should be noted that although fetch unit 104 and decode unit 106 are illustrated as two separate units in processor 100, these units can alternatively be combined into a single unit.

Figure 2:
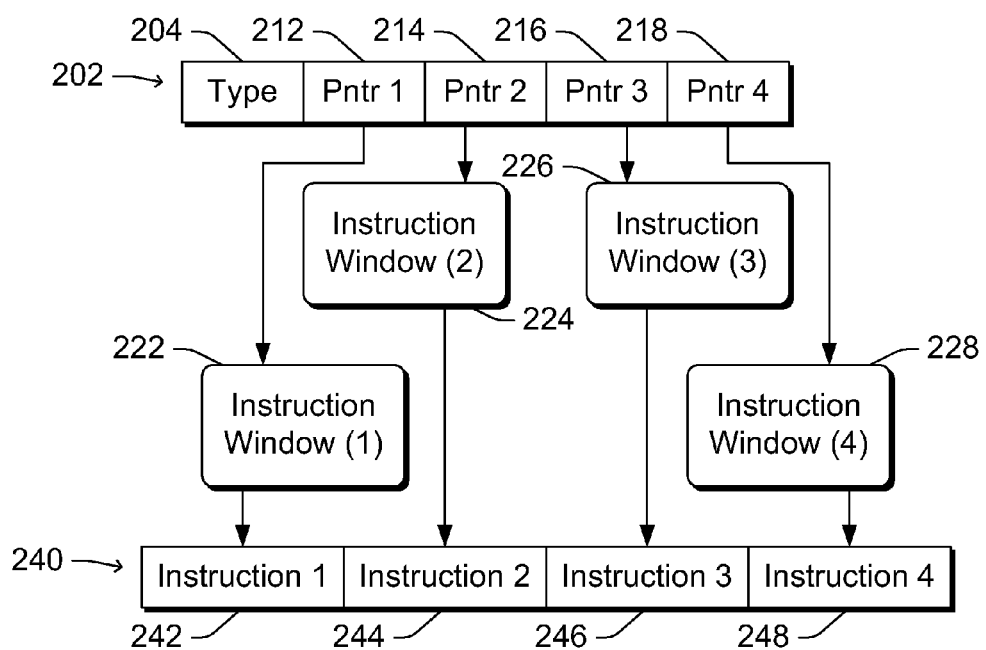
FIG. 2 illustrates an example instruction word including instruction pointers in accordance with one or more embodiments.

FIG. 2 illustrates an example very long instruction word including instruction pointers in accordance with one or more embodiments. Instruction word 202 has multiple portions, including an instruction word type portion 204 and data portions 212, 214, 216, and 218. Instruction word type portion 204 includes an identifier of a type of data included in data portions 212-218. This type of data could be, for example, one or more pointers, one or more instructions, or one or more portions of one or more instructions. Type portion 204 identifies both this type of data, as well as which portions 212-218 contain which types of data. In the illustrated example of FIG. 2, each of data portions 212-218 includes a pointer to an instruction. Alternatively, other data could be included in one or more of the data portions 212-218, such as an instruction or portion of an instruction. By identifying the type of data in each of data portions 212-218, the identifier in type portion 204 indicates how the instruction word is to be decoded (e.g., by decode unit 106 of FIG. 1).

In this particular example, a different instruction window 222, 224, 226, and 228 corresponds to each of the different data portions 212-218. Instruction windows 222-228 can be, for example, instruction windows 108 of FIG. 1. In the illustrated example of FIG. 2, instruction window 222 corresponds to data portion 212, instruction window 224 corresponds to data portion 214, instruction window 226 corresponds to data portion 216, and instruction window 228 corresponds to data portion 218. When a data portion 212-218 includes a pointer to an instruction, the data in the particular portion 212-218 identifies a particular location within the corresponding instruction window 222-228. Thus, in the illustrated example of FIG. 2, the pointer in portion 212 is a pointer to a location in instruction window 222.

The instruction in the pointed-to location in instruction window 222 is retrieved and used as the first instruction 242 in an expanded very long instruction word 240. Similarly, the pointer in portion 214 is a pointer to a location in instruction window 224, and the instruction in the pointed-to location in instruction window 224 is retrieved and used as the second instruction 244 in expanded very long instruction word 240. Similarly, the pointer in portion 216 is a pointer to a location in instruction window 226, and the instruction in the pointed-to location in instruction window 226 is retrieved and used as the third instruction 246 in expanded very long instruction word 240. Similarly, the pointer in portion 218 is a pointer to a location in instruction window 228, and the instruction in the pointed-to location in instruction window 228 is retrieved and used as the fourth instruction 248 in expanded very long instruction word 240.

It should be noted that, when retrieving instructions from the pointed-to locations in instruction windows 222, 224, 226, and 228, the instructions are read from those pointed-to locations and written to expanded very long instruction word 240. The instructions in the pointed-to locations, however, remain in those locations of instruction windows 222, 224, 226, and 228. The retrieving of the instructions does not delete the instructions in the pointed-to locations from their locations. Accordingly, subsequent instruction words can include pointers to those same locations, and have the same instructions read from the pointed-to locations in instruction windows 222, 224, 226, and 228 and written to subsequent expanded very long instruction words.

By having each data portion in instruction word 202 correspond to a different instruction window, no separate identifier need be included in instruction word 202 to identify which instruction window is being referenced by a particular pointer. Rather, it can be assumed that a pointer in a particular data portion refers to a location in the instruction window corresponding to that pointer. Alternatively, rather than maintaining this correspondence between data portions of instruction word 202 and particular instruction windows, one or more identifiers can be included in instruction word 202 (or alternatively elsewhere) to identify which instruction window a particular pointer refers to.

In the example of FIG. 2, each of the data portions 212-218 in instruction word 202 include pointers. It is to be appreciated that this is only an example, and that different combinations of one, two, or three data portions 212-218 can include pointers, or none of data portions 212-218 can include pointers. For example, for a particular very long instruction word, data portions 212, 216, and 218 may include pointers but data portion 214 does not; for another particular very long instruction word, data portion 212 may include a pointer but data portions 214, 216, and 218 do not, and so forth. Which particular portions 212-218 include pointers is identified by instruction type 204 as discussed above.

In situations where one or more of the portions 212-218 do not include pointers, multiple ones of portions 212-218 can be used to store a single instruction. For example, assume that very long instruction word 202 is 32 bits, type portion 204 is 8 bits, and each of data portions 212-218 is 6 bits. If an instruction is 16 bits, then three of data portions 212-218 would be used to store the instruction.

Additionally, in the example of FIG. 2, instruction word 202 includes four data portions 212-218. Alternatively, instruction word 202 can include three or fewer data portions, or five or more data portions.

Furthermore, in the example of FIG. 2, a different instruction window 222-228 is included corresponding to each data portion 212-218. Alternatively, fewer instruction windows 222-228 can be included than there are data portions 212-218. Such situations can arise, for example, where the particular instruction window corresponding to a particular pointer is identified in instruction word 202. By way of another example, a particular implementation may prohibit a particular data portion 212-218 from including a pointer, so an instruction window corresponding to that data portion need not be included.

In one or more embodiments, each instruction stored in an instruction window 222-228 includes register operand information. Thus, in such embodiments, each instruction stored in an instruction window includes one or more operands for the instruction. Alternatively, operand information can be included with the pointers (e.g., in data portions 212-218). This operand information would identify the operands for a particular pointed-to instruction, so instruction windows 222-228 would not store the operands for the instruction.

Returning to FIG. 1, decode unit 106 accesses an instruction word type included in the very long instruction word received from fetch unit 104 to identify whether the very long instruction word includes instructions and/or pointers to instructions. For one or more portions of the very long instruction word that include pointers to instructions, decode unit 106 retrieves the instructions pointed to by each of those portions from instruction windows 108.

The instructions within the very long instruction word, as well as instructions pointed to in the very long instruction word, are then decoded as appropriate so that they can be executed by functional units 110(1-x). The specific manner in which the instructions are decoded can vary by implementation. This decoding can include converting an instruction to a format expected by a particular functional unit 110 (such as converting the instruction to one or more micro-operations), retrieving register values or values from other memory locations, and so forth.

Functional units 110 represent a variety of different functional units. Functional units 110 can, for example, add or subtract numbers, multiply or divide numbers, retrieve values from and/or store values in registers, and so forth.

Decode unit 106 can optionally generate an expanded very long instruction word, such as expanded very long instruction word 240 shown in FIG. 2. This expanded very long instruction word includes the instructions in the very long instruction word retrieved by fetch unit 104, as well as instructions pointed to in the very long instruction word retrieved by fetch unit 104. Decode unit 106 can then proceed to decode the expanded very long instruction word. Alternatively, such an expanded very long instruction word 240 need not be generated by decode unit 106. Rather, decode unit 106 can receive some instructions from fetch unit 104 (those instructions in the very long instruction word retrieved by fetch unit 104), and retrieve some instructions from instruction windows 108 (those instructions pointed to in the very long instruction word retrieved by fetch unit 104), and then decode those instructions for execution by functional units 110 without actually generating an expanded very long instruction word.

In one or more embodiments, one type of instruction that can be included in a very long instruction word is an instruction window load operation. The instruction window load operation identifies an instruction, an instruction window, and a location in the identified instruction window into which the identified instruction is to be stored. In executing the instruction window load operation, a functional unit 110 stores the identified instruction in the identified location of the identified instruction window. Once stored in the identified location, a pointer to that location can be used in subsequent VLIWs in order to have the instruction in that location retrieved and executed. Each of the instruction, instruction window, and location in the instruction window can be identified explicitly (e.g., by including identifiers of each in the instruction window load operation), or alternatively implicitly (e.g., different instruction window load operations can be specific to loading a particular instruction, loading an instruction into a particular instruction window, and/or loading an instruction into a particular location of an instruction window).

It should be noted that, once an instruction is stored in an instruction window, the instruction can be identified by pointers in multiple subsequent VLIWs. No other modifications to the instruction window need be made until another instruction is to be stored in the instruction window (e.g., using another instruction window load operation). The location can optionally be overwritten by a subsequent instruction window load operation, but if not overwritten the instruction is maintained in the instruction window and can be pointed to by subsequent VLIWs in the program (and/or other programs).

When a very long instruction word includes a pointer to an instruction, decode unit 106 retrieves the pointed-to instruction from an instruction window 108, decodes the instruction, and passes the decoded instruction to a functional unit 110. This retrieval of the pointed-to instruction refers to reading the instruction from the pointed-to location in the instruction window 108, as discussed above. Additionally, one or more portions of the very long instruction word may not include a pointer to an instruction. In such situations, the particular instruction included in a particular one or more portions is decoded and passed to a functional unit 110.

In one or more embodiments, the number of functional units 110 is equal to the number of instructions that can be included in a very long instruction word (e.g., one for each data portion in instruction word 202 of FIG. 2). For example, in FIG. 2 there are four data portions 212-218, each of which can include a pointer to an instruction, so there are four functional units 110. These four functional units 110 can execute instructions concurrently so that the four pointed-to instructions can be executed concurrently. Alternatively, the number of functional units may be greater than or less than the number of instructions that can be included in a very long instruction word. The functional units 110 executing instructions concurrently refers to each functional unit being able to execute an instruction at the same time as the other functional units. For example, each functional unit 110 could execute a different instruction in the same clock cycle. Alternatively, some instructions may require more clock cycles for execution than other instructions, in which case some functional units may proceed to execute additional instructions while another functional unit is still executing the same instruction.

It should be noted that the number of bits used as a pointer to an instruction is typically less than the number of bits in an instruction. Accordingly, the number of instructions that can be included in a very long instruction word (before being expanded by decode unit 106) is less than the number of pointers to instructions that can be included in a very long instruction word. For example, assume that each instruction input to a functional unit 110 is 16 bits, and that each very long instruction word is 32 bits. Following this example, instruction memory 102 stores 32-bit very long instruction words, the data bus from instruction memory 102 to fetch unit 104 is 32 bits, and fetch unit 104 stores 32-bit very long instruction words. However, if each instruction window 108 includes 16 locations, each of which can be referenced using 4 bits, and there are four instruction windows 108, then four different instructions can be pointed to in the very long instruction word using only 16 bits. Thus, even though the very long instruction word is 32 bits, once expanded by decode unit 106 that 32-bit very long instruction word can include four 16-bit instructions.

Using instruction pointers in the very long instruction words can reduce the length of the very long instruction words as stored in instruction memory 102 and retrieved by fetch unit 104. For example, assume that instructions in processor 100 are each 16 bits, that each instruction window 108 includes 8 registers, that there are 4 instruction windows 108, and that 4 bits are used to identify the type of the very long instruction word. In this example, 32 different instructions can be stored in instruction windows 108, and each of these 32 different instructions can be referenced by a pointer. Thus, following this example, each pointer could be 3 bits, so each very long instruction word could be 16 bits: 3 bits for each of the 4 instructions for a total of 12 bits, plus 4 bits for the instruction word type. In contrast, without using pointers, the very long instruction word would be 64 bits (16 bits per instruction times 4 instructions). Thus, using the instruction pointers, instruction memory 102 could be 16 bits wide rather than 64 bits wide, and the instruction path from instruction memory 102 to decode unit 106 (including fetch unit 104) could be 16 bits wide rather than 64 bits wide.

In one or more embodiments, the number of bits used for each instruction in the very long instruction word using the techniques discussed herein can be calculated using the formula (L log 2N+L), where L refers to a number of lanes and N refers to a number of storage locations in each instruction window 108. A lane refers to a number of instructions that can be input to functional units 110 by decode unit 106 concurrently (e.g., in a single clock cycle). Accordingly, the instruction storage and throughput advantage is a ratio of the original instruction length and the calculated instruction storage space. For example, if 4 instructions can be passed from decode unit 106 to functional units 110 concurrently (L=4), and each instruction window 108 includes 4 storage locations (N=4), the number of bits used for each instruction is calculated as 4×log 8+4=7.61, which is rounded up to 8 bits. As L=4, there would be four such instructions in a very long instruction word, for a total of 32 bits. If the original instruction length is 64 bits, then the bit savings in this example is a savings of 64+32=2 times.

Figure 3:
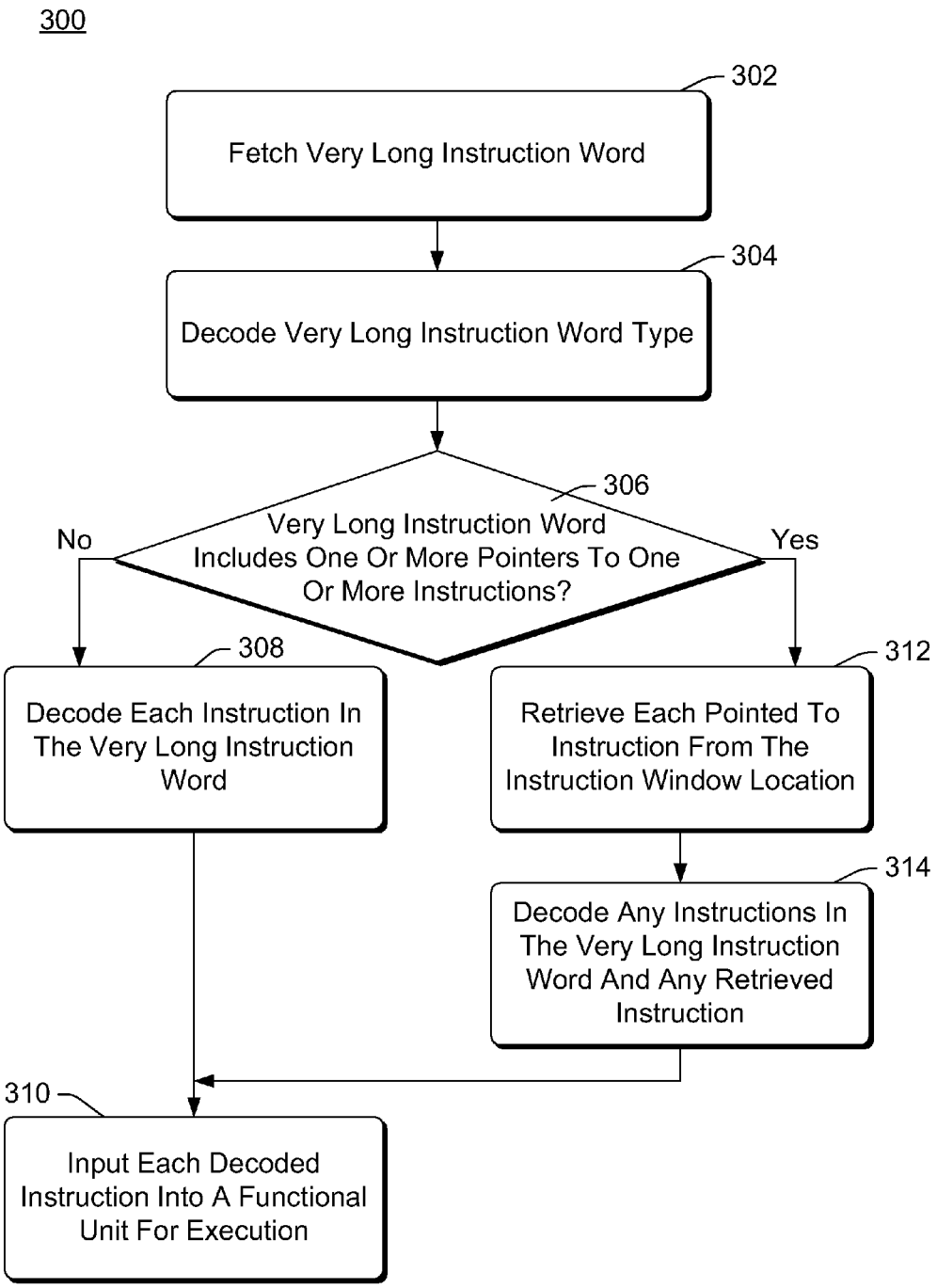
FIG. 3 is a flowchart illustrating an example process for implementing the instruction pointers in very long instruction words in accordance with one or more embodiments.

FIG. 3 is a flowchart illustrating an example process 300 for implementing the instruction pointers in very long instruction words in accordance with one or more embodiments. Process 300 is implemented by components of a processor, such as a fetch unit 104 and/or decode unit 106 of FIG. 1. Process 300 is typically performed in hardware or firmware, although can alternatively be performed in software.

Initially, a very long instruction word is fetched from an instruction memory (act 302). A type of the very long instruction word is decoded (act 304) and a determination made as to whether the very long instruction word includes one or more pointers to one or more instructions (act 306). If the very long instruction word does not include a pointer to an instruction, then each instruction in the very long instruction word is decoded (act 308) and input into a functional unit for execution (act 310).

However, if a very long instruction word includes one or more pointers to instructions, then each pointed-to instruction is retrieved from an instruction window location (act 312). This retrieving refers to reading the instruction from the pointed-to location in the instruction window, as discussed above. The instructions retrieved in act 312, as well as other instructions in the very long instruction word, are decoded (act 314) and each decoded instruction is input into a functional unit for execution (act 310).

Returning to FIG. 1, programs are compiled for execution by processor 100 using a VLIW compiler. The VLIW compiler has knowledge of the functional units 110 available in processor 100, as well as the instruction windows 108 and the format of the very long instruction words. Accordingly, the VLIW compiler can compile a program for execution by processor 100 so that multiple instructions and/or pointers to instructions are included in a particular very long instruction word. Furthermore, in one or more embodiments, the VLIW compiler can select which instructions are to be loaded into which locations of instruction windows 108 during execution of the program, and thus the VLIW compiler is aware of which instructions in the very long instruction words can be replaced with pointers to instructions in instruction windows 108. In embodiments in which the VLIW compiler does not select which instructions are to be loaded into the instruction windows 108 during execution of the program, the VLIW compiler receives an input or otherwise has access to information identifying which instructions are loaded into which locations of instruction windows 108.

Figure 4:
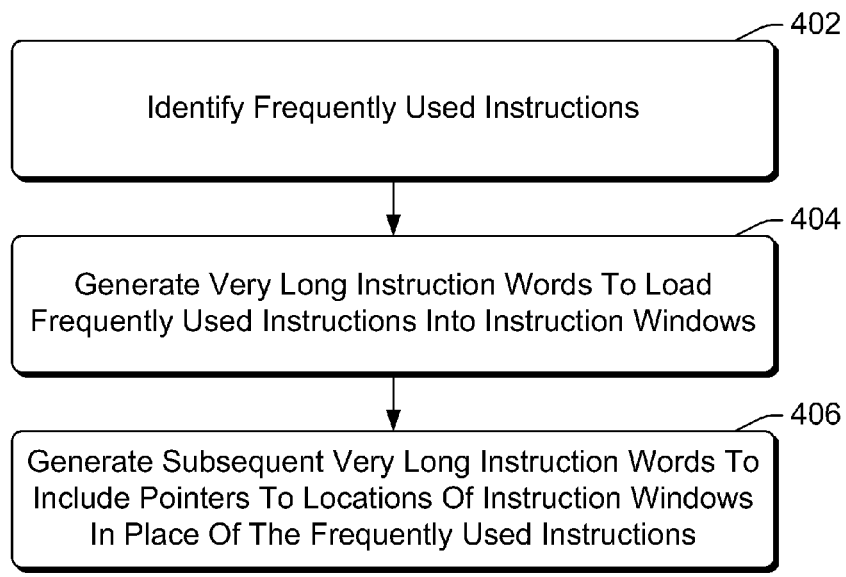
FIG. 4 is a flowchart illustrating an example process for implementing the instruction pointers in very long instruction words in accordance with one or more embodiments.

FIG. 4 is a flowchart illustrating an example process 400 for implementing the instruction pointers in very long instruction words in accordance with one or more embodiments. Process 400 is implemented by a compiler and can be performed in software, firmware, hardware, or combinations thereof.

Initially, frequently used instructions are identified (act 402). These frequently used instructions can be identified in a variety of different manners. In one or more embodiments, frequently used instructions are identified by counting a number of times each instruction appears in a program. Alternatively, frequently used instructions can be identified in other manners, such as by analyzing expected execution paths for the program and counting a number of times each instruction is expected to be executed in the program. The instructions having the highest counts (e.g., number of times of appearance in the program, number of times expected to be executed, and so forth) can be selected as the frequently used instructions.

One or more very long instruction words are generated to load the frequently used instructions into locations in the instruction windows (act 404). As discussed above, each instruction window can include multiple locations. Each very long instruction word generated in act 404 includes one or more instructions, each of which includes an identifier of an instruction, an instruction window, and a location in the instruction window. When executing one of these instructions, a functional unit stores the identified instruction in the identified location of the identified instruction window.

Subsequent very long instructions words are also generated to include pointers to locations in the instruction windows in place of these frequently used instructions (act 406). As discussed above with respect to act 404, the compiler determines the instruction to be stored, the instruction window and the location in the instruction window. Accordingly, the compiler knows the location of that instruction in the instruction windows and thus can subsequently generate a pointer to that instruction.

FIG. 4 is discussed with reference to frequently used instructions being stored in the instruction windows. Alternatively, as discussed above, criteria other than frequency can be used to determine which instructions are to be stored in the instruction windows, such as instruction type, random selection, and so forth.

Figure 5:
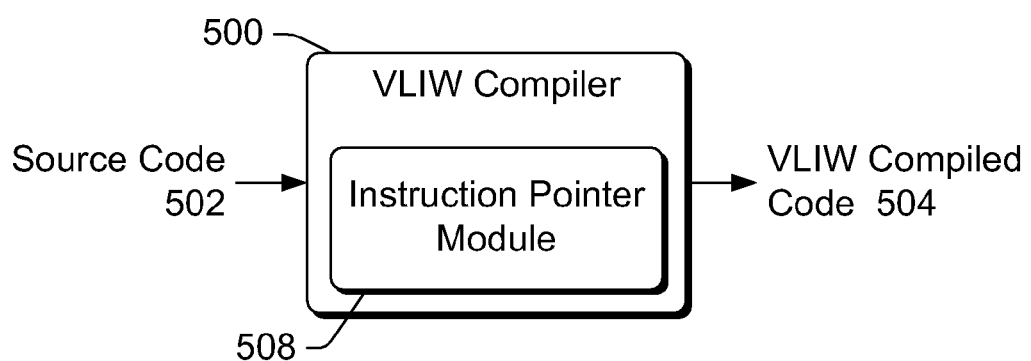
FIG. 5 illustrates an example very long instruction word compiler in accordance with one or more embodiments.

FIG. 5 illustrates an example very long instruction word compiler 500 in accordance with one or more embodiments. VLIW compiler 500 receives a program source code 502, compiles source code 502 for a VLIW processor, and outputs VLIW compiled code 504. VLIW compiled code 504 includes multiple very long instruction words to be executed by the VLIW processor to run the program. VLIW compiler 500 includes an instruction pointer module 508 that determines the instructions to be stored in the instruction windows when compiled code 504 is executed. As discussed above, this determination can be performed by module 508 (e.g., by analyzing the frequency of instructions in source code 502 or in a compiled version of source code 502), or alternatively can be performed by another component or module and the instructions identified to module 508. Module 508 can also generate the instruction window load operations to load the identified instructions into the instruction windows. In one or more embodiments, VLIW compiler 500 implements process 400 of FIG. 4.

VLIW compiler 500 is typically implemented in software, although alternatively can be implemented in firmware or hardware. VLIW compiler 500 can be implemented as multiple instructions stored on a variety of computer readable media, such as a hard disk, optical disk, read only memory (ROM), random access memory (RAM), flash memory, and so forth. These multiple instructions are executed by one or more processors of one or more computers to carry out the functionality of VLIW compiler 500 described herein.

The following Tables I-V illustrate an example implementation of the instruction pointers in very long instruction words. This example refers to the use of the very long instruction words in an example implementation of a loop buffer sequencer. It is to be appreciated that this implementation is only an example, and that the instruction pointers in very long instruction words can be implemented in numerous other manners.

Table I illustrates an example instruction format implementation using the instruction pointers in very long instruction words in accordance with one or more embodiments. In this example, the very long instruction word includes 32 bits with 4 bits abcd identifying the instruction type (e.g., type 204 of FIG. 2) and the remaining 28 bits identifying an instruction and/or pointer to an instruction (e.g., one or more portions 212-218 of FIG. 2).

TABLE I

| abcd | SIMD Instruction/Joint PC/Counter |
|------|-----------------------------------|

In this example, a SIMD (Single Instruction, Multiple Data) loop buffer is populated with SIMD and LBS (Loop Buffer Sequencer) instructions. Based on the instruction types, the SIMD pipe, the LBS unit, or both the SIMD pipe and the LBS unit perform operations for a given very long instruction word. When LBS and SIMD instructions are assembled as part of the same very long instruction word, the four bits abcd describe how the instructions are encoded in the remaining 28 bits. The LBS architecture includes one instruction window with multiple locations for the LBS instructions, and one of these pointed-to instructions can optionally be executed concurrently with a SIMD instruction. The instruction window supports both loading of the instruction window from the loop buffer by the LBS, and also reading of a loaded instruction by the LBS for execution.

Continuing with this example, four different types of very long instruction words can be issued. The first of these four types, referred to as Type 0, is described in Table II.

TABLE II

| 31 | 30 | 29 | 28 | 27 | 26 | 25 | 24 | 23:16 | 15:0 |
|----|----|----|----|----|----|----|----|-------|------|
| SIMD | | | | 0000 | | | | SIMD | |

For Type 0, the very long instruction word being Type 0 is shown in Table II at bits 27:24. The remaining 28 bits of the very long instruction word contains a SIMD instruction for which the PC (program counter) should be incremented. This SIMD instruction is shown in Table II at bits 31:28 and 23:0. This is a SIMD instruction and the very long instruction word does not include a pointed-to instruction.

The second of these four types, referred to as Type 1, is described in Table III.

TABLE III

| 31 | 30 | 29 | 28 | 27 | 26 | 25 | 24 | 23:16 | 15:0 |
|----|----|----|----|----|----|----|----|-------|------|
| PC and Counter Management | | | | 0001 | | | | PC and Counter Management | |

For Type 1, the very long instruction word being Type 1 is shown in Table III at bits 27:24. The remaining 28 bits of the very long instruction word contains an LBS instruction (LBS instruction types a, b, or c). This LBS instruction (loop buffer instruction) is shown in Table III at bits 31:28 and 23:0. This is a loop buffer instruction and the very long instruction word does not include a pointed-to instruction.

The third of these four types, referred to as Type 2, is described in Table IV.

TABLE IV

| 31 | 30 | 29 | 28 | 27 | 26 | 25 | 24 | 23:16 | 15:0 | | | |
|----|----|----|----|----|----|----|----|-------|------|---|---|---|
| PC and Counter Management | | | | 0010 | | | | PC and Counter Management | 0 | 0 | 0 | xyz |

For Type 2, the very long instruction word being Type 2 is shown in Table IV at bits 27:24. The remaining 28 bits of the very long instruction word contains one or more LBS instructions for loading to the instruction window. Of the 28 bits, 3 bits identify a location (xyz) in the instruction window (shown as bits 2:0 in Table IV), and the remaining 25 bits (shown as bits 31:28 and 23:3 in Table IV) identify the instruction to be loaded into the location of the instruction window identified by the 3 bits.

The fourth of these four types, referred to as Type 3, is described in Table V.

TABLE V

| 31 30 29 | 28 27 26 25 24 | 23:16 | 15:0 |
|---|---|---|---|
| SIMD | 1xyz | | SIMD |

For Type 3, the very long instruction word being Type 3 is shown in Table V at bits 27:24. The remaining 28 bits of the very long instruction word contains a SIMD instruction, and 4 bits specifies which entry of the instruction window is to be executed (which location is pointed to). This SIMD instruction is shown in Table V at bits 31:28 and 23:0. Additionally 3 bits (shown in Table V as bits 26:24) of the instruction type identify which location (xyz) of the instruction window is pointed-to (and thus is to be retrieved and executed).

VLIW processors employing the instruction pointers in very long instruction words described herein can be utilized in various environments. For example, VLIW processors employing the instruction pointers in very long instruction words can be utilized in desktop computers, server computers, handheld or laptop computers, or other types of computers, hard disk drives, digital versatile (or video) disc drives, high definition televisions (HDTVs), a communication system of a vehicle, a control system of a vehicle, a set top box, a cellular or other wireless phone, a media player, a Voice over Internet Protocol (VoIP) phone, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    fetching a first very long instruction word, the first very long instruction word including a type identifier and multiple portions, the type identifier identifying whether each of the multiple portions contains an instruction or a pointer to an instruction;
    identifying a first portion of the multiple portions of the first very long instruction word that includes a first pointer to a first instruction;
    retrieving, from a first location of a first instruction window that has been pre-loaded with the first instruction, the first instruction pointed to by the first pointer; and
    inputting the retrieved first instruction into a first functional unit for execution.

2. A method as recited in claim 1, further comprising:
    identifying a second portion of the first very long instruction word that includes a second instruction; and
    inputting the second instruction into a second functional unit for execution concurrent with execution of the retrieved first instruction.

3. A method as recited in claim 1, further comprising:
    identifying a second portion of the first very long instruction word that includes a second pointer to a second instruction;
    retrieving, from a second location of a second instruction window that has been pre-loaded with the second instruction, the second instruction pointed to by the second pointer; and
    inputting the second instruction into a second functional unit for execution concurrent with execution of the first instruction pointed to by the first pointer.

4. A method as recited in claim 1, wherein the type identifier identifies which of the multiple portions is the first portion that includes the first pointer to the first instruction.

5. A method as recited in claim 1, further comprising prior to the fetching, identifying, retrieving, and inputting:
    fetching a second very long instruction word that includes the first instruction, an identifier of the first instruction window, and an identifier of the first location of the first instruction window; and
    inputting the first instruction, the identifier of the first instruction window, and the identifier of the first location of the first instruction window into a functional unit to load the first instruction into the identified first location of the identified first instruction window.

6. A method as recited in claim 1, wherein each of the multiple portions corresponds to a different one of multiple instruction windows, and the pointer in one of the multiple portions points to the instruction in the corresponding one of the multiple instruction windows.

7. A method as recited in claim 1, wherein the first instruction window includes multiple locations, and each of the multiple locations stores a different instruction.

8. A method as recited in claim 1, the retrieving comprising retrieving, from the first location of the first instruction window, one or more operands for the first instruction pointed to by the first pointer.

9. A method as recited in claim 1, further comprising decoding the retrieved first instruction to generate a decoded instruction, and wherein the inputting comprises inputting the decoded instruction into the first functional unit for execution.

10. A method as recited in claim 1, wherein the first instruction window stores selected instructions based on a criterion.

11. A method as recited in claim 10, wherein the criterion includes frequently used instructions for a program being executed.

12. A method as recited in claim 1, wherein the first pointer to the first instruction is fewer bits than the first instruction.

13. A processor comprising:
    a fetch unit to fetch a first very long instruction word, the first very long instruction word including a type identifier and multiple portions, the type identifier identifying whether each of the multiple portions contains an instruction or a pointer to an instruction;
    a first instruction window to store a first instruction;
    multiple functional units to execute instructions; and
    a decode unit configured to:
        identify a first portion of the multiple portions of the first very long instruction word that includes a first pointer to the first instruction;
        retrieve, from a first location of the first instruction window that has been pre-loaded with the first instruction, the first instruction pointed to by the first pointer; and
        input the retrieved first instruction into a first one of the multiple functional units for execution.

14. A processor as recited in claim 13, wherein the fetch unit and the decode unit are part of a same unit.

15. A processor as recited in claim 13, wherein the decode unit is further configured to:

identify a second portion of the first very long instruction word that includes a second instruction; and input the second instruction into a second one of the multiple functional units for execution concurrent with execution of the retrieved first instruction.

16. A processor as recited in claim 13, wherein the decode unit is further configured to:

identify a second portion of the first very long instruction word that includes a second pointer to a second instruction;

retrieve, from a second location of a second instruction window that has been pre-loaded with the second instruction, the second instruction pointed to by the second pointer; and input the second instruction into a second one of the multiple functional units for execution concurrent with execution of the first instruction pointed to by the first pointer.

17. A processor as recited in claim 13, wherein the type identifier identifies which of the multiple portions is the first portion that includes the first pointer to the first instruction.

18. A processor as recited in claim 13, wherein the decode unit is further configured to, prior to performing the identifying, retrieving, and inputting:

fetch a second very long instruction word that includes the first instruction, an identifier of the first instruction window, and an identifier of the first location of the first instruction window; and input the first instruction, the identifier of the first instruction window, and the identifier of the first location of the first instruction window into a functional unit to load the first instruction into the identified first location of the identified first instruction window.

19. A processor as recited in claim 13, wherein each of the multiple portions corresponds to a different one of multiple instruction windows, and the pointer in one of the multiple portions points to the instruction in the corresponding one of the multiple instruction windows.

20. A processor as recited in claim 13, wherein the first instruction window includes multiple locations, and each of the multiple locations stores a different instruction.

21. A processor as recited in claim 13, wherein to retrieve the first instruction is further to retrieve, from the first location of the first instruction window, one or more operands for the first instruction pointed to by the first pointer.

22. A processor as recited in claim 13, wherein the decode unit is further configured to decode the retrieved first instruction to generate a decoded instruction, and wherein to input the retrieved first instruction is to input the decoded instruction into the first one of the multiple functional units for execution.

23. A processor as recited in claim 13, wherein the first instruction window stores selected instructions based on a criterion.

24. A processor as recited in claim 23, wherein the criterion includes frequently used instructions for a program being executed by the processor.

25. A processor as recited in claim 13, wherein the first pointer to the first instruction is fewer bits than the first instruction.

26. A computer readable medium having stored thereon multiple instructions that, when executed by a processor, causes the processor to generate a first very long instruction word having both an instruction word type identifier and multiple portions, the instruction word type identifier identifying whether each of the multiple portions contains an instruction or a pointer to an instruction, a first portion of the multiple portions including a first pointer to a first instruction that has been pre-loaded into a first instruction window of the processor, and the instruction word type identifier indicating which of the multiple portions is the first portion.

27. The computer readable medium as recited in claim 26, wherein a second portion of the multiple portions includes a second instruction to be executed concurrently with the first instruction pointed to by the first pointer, and the instruction word type identifier further indicating which of the multiple portions is the second portion.

* * * * *